US012005473B2

(12) United States Patent
Hibbs

(10) Patent No.: US 12,005,473 B2
(45) Date of Patent: Jun. 11, 2024

(54) DEVICE AND METHOD FOR IMPROVED DISPENSING CONTROL DURING PLACEMENT OF VISCOUS MATERIAL

(71) Applicant: Steady-Flo Inc., Ottawa (CA)

(72) Inventor: Thomas Richard Hibbs, Paradise (CA)

(73) Assignee: Steady-Flo Inc., Ottawa (CA)

( * ) Notice: Subject to any disclaimer, the term of this patent is extended or adjusted under 35 U.S.C. 154(b) by 0 days.

(21) Appl. No.: 17/778,395

(22) PCT Filed: Nov. 19, 2020

(86) PCT No.: PCT/CA2020/051581
§ 371 (c)(1),
(2) Date: May 19, 2022

(87) PCT Pub. No.: WO2021/097575
PCT Pub. Date: May 27, 2021

(65) Prior Publication Data

US 2023/0025092 A1 Jan. 26, 2023

Related U.S. Application Data

(60) Provisional application No. 62/937,622, filed on Nov. 19, 2019.

(51) Int. Cl.
*B05C 17/005* (2006.01)
*B05C 17/01* (2006.01)
*B65D 83/00* (2006.01)

(52) U.S. Cl.
CPC .. *B05C 17/00596* (2013.01); *B05C 17/00576* (2013.01); *B05C 17/0123* (2013.01); *B65D 83/0038* (2013.01)

(58) Field of Classification Search
CPC ........ B05C 17/00596; B05C 17/00576; B05C 17/0123; B65D 83/0038
See application file for complete search history.

(56) References Cited

U.S. PATENT DOCUMENTS 2,598,482 A * 5/1952 Abrams ............. B65D 47/2093 222/496
4,193,513 A * 3/1980 Bull, Jr. .................. G01F 11/02 222/105

(Continued)

FOREIGN PATENT DOCUMENTS

EP 1651545 12/2011

OTHER PUBLICATIONS

International Search Report issued for International Patent Application No. PCT/CA2020/051581, dated Jan. 27, 2021.

(Continued)

*Primary Examiner* — Bob Zadeh
(74) *Attorney, Agent, or Firm* — Diederiks & Whitelaw, PLC.

(57) ABSTRACT

A resiliently deformable member for use in an apparatus for dispensing a viscous material from a container, such as an apparatus consisting of a container for holding the viscous material and a dispensing gun. The resiliently deformable member has a relaxed state and a compressed state. In use, the resiliently deformable member applies a force between the container and the dispensing gun to modulate the flow of the material from the container.

9 Claims, 5 Drawing Sheets

(56) References Cited

U.S. PATENT DOCUMENTS

| | | | | | |
|---|---|---|---|---|---|
| 4,957,223 | A | * | 9/1990 | Beilush | B05C 17/0136 222/326 |
| 5,482,189 | A | * | 1/1996 | Dentler | B05C 17/014 222/391 |
| 5,884,818 | A | * | 3/1999 | Campbell | B05C 17/00576 222/340 |
| 5,887,765 | A | | 3/1999 | Broesamle | |
| 7,073,691 | B2 | | 7/2006 | Rumrill | |
| D863,002 | S | * | 10/2019 | Hung | D8/14.1 |
| D937,904 | S | * | 12/2021 | Kim | D15/7 |
| D937,905 | S | * | 12/2021 | Kim | D15/7 |
| 2011/0006076 | A1 | * | 1/2011 | Williams | B05C 17/00583 222/391 |
| 2014/0084022 | A1 | * | 3/2014 | Paul | B05C 17/00576 222/326 |
| 2017/0021984 | A1 | * | 1/2017 | Decottignies | B05C 17/0136 |

OTHER PUBLICATIONS

Written Opinion issued for International Patent Application No. PCT/CA2020/051581, dated Jan. 27, 2021.

International Preliminary Report on Patentability issued for International Patent Application No. PCT/CA2020/051581, dated Mar. 7, 2022.

* cited by examiner

DEVICE AND METHOD FOR IMPROVED DISPENSING CONTROL DURING PLACEMENT OF VISCOUS MATERIAL

FIELD

The present disclosure relates generally to the placement of viscous material, such as caulking, adhesive and the like, while using a dispensing gun. More particularly, the present disclosure relates to devices and methods for improved dispensing control during placement of viscous materials.

BACKGROUND

The application of viscous materials is widely used in the construction industry, for example, to provide waterproofing, thermal insulation, adhesion, aesthetic appeal, reduce noise transmission, etc. A common process requires the bonding or sealing of different materials with caulking, sealants, adhesives, polymers and/or other viscous products. Most of these products are manufactured, packaged, stored and transported in plastic or cardboard cylindrical containers, known as "tubes". The contents of these tubes are easily dispensed by placing the tube in a hand-held dispensing device, such as a caulking gun, and by cutting off the tip of the tube to allow the contents to be dispensed by the application of pressure to the contents of the tube. In such devices, pressure is most often created by compressing a hand lever.

Although there are numerous hand-held lever action dispensing guns on the market, they suffer drawbacks. The recent development of electric, air and hydraulic caulking guns address some of these drawbacks but they are very costly, and they do not apply to the estimated four billion caulking guns sold and/or on the market today.

BRIEF DESCRIPTION OF THE DRAWINGS

Embodiments of the present disclosure will now be described, by way of example only, with reference to the attached Figures.

FIG. 1 illustrates an embodiment of the invention.

FIG. 2 illustrates another embodiment of the invention.

FIG. 3 illustrates another embodiment of the invention.

FIG. 5 illustrates another embodiment of the invention.

FIG. 6 illustrates another embodiment of the invention.

FIG. 7 illustrates another embodiment of the invention, where

FIG. 21 shows cross sectional elevation views of resiliently deformable members consisting of a compression spring (210) and a threaded thumb nut (211) to be threaded onto a dispensing gun's plunger shaft (212). FIG. 21A shows an embodiment with an additional top cap (213), whereas

FIG. 22 shows an embodiment where the bottom cap (222) is manufactured as a part of the dispensing gun's plunger (223).

FIG. 23 shows an embodiment where the bottom cap (232) is for attachment to a dispensing gun's plunger shaft (233).

DETAILED DESCRIPTION

Figure 1A:
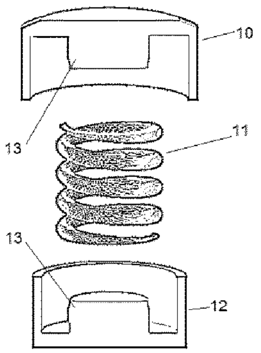
FIG. 1A shows an exploded cross-sectional elevation view.

One of the drawbacks of conventional hand-held lever action dispensing guns, e.g. caulking guns, is that none address the issue of the consistency of product flow while in use. The present day caulking guns provide product flow while pressure is applied to the product via compression of a hand-held lever. Once the lever has reached its limit of travel, the ability to apply more pressure is exhausted, so it must be re-cocked or repositioned so that application of pressure on the product can be reestablished by once again compressing the hand lever. During this procedure, the flow of product is disrupted.

In order to achieve a consistent and even flow of product from the caulking gun, a skilled, experienced, hand is needed. It is difficult for an inexperienced worker to create an even flow of product as the standard hand-held device disrupts the flow of the tube's contents whenever pressure is released and re-applied to the hand lever of the caulking gun. Each additional re-cocking of the hand lever disrupts the flow causing gaps or beads, making the finished project appear unattractive and/or of inferior workmanship.

Another drawback to conventional caulking guns is that they can only dispense product while under pressure. So, once the pressure is relieved to re-cock the hand held lever, the product flow is stopped, or reduced to the level achieved by any residual pressure within the tube. Unless the movement of the caulking gun is stopped or slowed to compensate for the reduced flow rate, the result will be a gap in the dispensed product. Therefore, in the field of dispensing guns, e.g. caulking guns, a need exists to provide a substantially continuous application of pressure to the product while the hand lever is being re-cocked or re-engaged. This pressure results in a continuing flow of product while the hand lever is being re-cocked. The result is the reduction or elimination of gaps that would normally occur when product flow is interrupted, thus avoiding the potential for an inferior seal, adhesion or presentation.

Generally, the present disclosure provides devices and methods for modulating the flow, and/or achieving a substantially consistent flow, of viscous material in a dispensing apparatus. This may be referred to herein as a "steady flow effect". The devices disclosed herein comprise a resiliently deformable member for co-operation with a dispensing apparatus for placement of viscous material. The dispensing apparatus may be any suitable dispensing apparatus, for example, a dispensing gun and/or a viscous material container for use with a resiliently deformable member according to an embodiment of the invention. The terms "viscous material" and "fluid material" may be used interchangeably. The viscous material container may be a cylindrical plastic or cardboard tube, such as a caulking tube having a nozzle at one end, a plug in the form of an end cap slideably supported in the container toward the opposite end, which terminates in an opening to receive the plunger of a dispensing device for pushing the plug to dispense the viscous material. The viscous material container is not limited to plastic or cardboard tubes, but may be constructed from other suitable materials and/or differently shaped to achieve the same effect. In some embodiments, the viscous material container is a caulking tube. In some embodiments, the viscous material container may be of the type comprising a flexible plastic sleeve. In some embodiments, the dispensing gun may be a hand-held device such as a caulking gun of the type having a frame for receiving the viscous material container, a handle extending from the frame, a plunger shaft slideably supported in the frame for advancing the container plug, a trigger pivoted to the frame and retractable against the handle, and a plunger drive mechanism for engagement with the trigger and advancement of the plunger shaft when the trigger is retracted. The dispensing gun may have a plunger shaft that terminates in a disc-shaped plunger plate, for pushing the cartridge plug. The plunger plate and shaft may be manufactured as a single piece, or the plunger plate may be removable, for example, if the plunger plate is threaded onto the plunger shaft. The terms dispensing gun and caulking gun may be used interchangeably herein. In the industry, the term caulking gun is often used to refer to a gun for dispensing materials other than caulking. Likewise, the terms viscous material container and caulking tube may be used interchangeably. In some embodiments, the viscous material container is a caulking tube and the dispensing gun is a caulking gun. However, a person of skill in the art will readily recognize that the resiliently deformable member can be used in applications other than with a caulking gun and tube, without departing from the spirit of the invention.

The resiliently deformable member serves to modulate the flow of viscous material from its container while the dispensing gun is in use. The resiliently deformable member can be used with many variations of dispensing gun and tube. In some embodiments, the resiliently deformable member is for use with a standard caulking gun with a caulking tube, and ensures that pressure continues to be applied to the viscous material while the caulking gun is being re-cocked. There are many variations on how this pressure can be achieved using different embodiments of the resiliently deformable member of the present invention. Described herein are non-limiting examples of variations of the device and method of the present invention.

The resiliently deformable member has a relaxed state and a compressed state. In the compressed state, the member stores energy. It should be recognized that the compressed state need not be limited to a completely compressed state, and can include semi-compressed states. As the member moves from the compressed state to the relaxed state, the stored energy is released and can be used to modulate the flow of viscous material from a dispensing tube. Armed with this knowledge, a skilled person will be able to envision different embodiments and means to harness and release energy in order to modulate the flow of viscous material. In some embodiments, the resiliently deformable member can be inserted into the back of the viscous material container. In some embodiments, the resiliently deformable member may be attached to or manufactured into a viscous material container's end cap. In some embodiments, the resiliently deformable member may be attached to or manufactured into a dispensing gun. In some embodiments, certain components of the resiliently deformable member may be attached to or manufactured into both the container and dispensing gun. In some embodiments, the resiliently deformable member can be installed into a caulking tube end cap and/or onto a caulking gun. Listed herein are numerous versions and variations of resiliently deformable members and their parts, but a person of skill in the art will recognize that other forms of resiliently deformable members can offer similar results, without departing from the spirit of the present invention.

Once placed between the viscous material container's plug and the dispensing gun's plunger, the resiliently deformable member is compressible when the plunger shaft is advanced, thus applying a force between the container plug and plunger. This force modulates the flow of viscous material and, in certain embodiments, creates a substantially continuous application of pressure to produce an even flow of viscous material (e.g. caulking) without any hesitations or flow stoppages while the dispensing gun is being used, for example when the hand lever is re-cocked or re-engaged. This effect may be referred to as a "steady flow effect". The resiliently deformable member can also reduce or eliminate caulking tube drips and also reduce or stop leakage when the caulking gun is de-activated.

The dispensing gun may be of any suitable type, for example, the type having: a frame adapted to receive a container; a handle extending from the frame; a plunger shaft slideably supported in the frame for dispensing viscous material from the container; a trigger coupled to the frame and retractable against the handle; and a plunger drive mechanism for engagement with the trigger and advancement of the plunger shaft when the trigger is retracted. The trigger may be a hand actuated lever. The dispensing gun may be a standard caulking gun. It will be appreciated by those of skill in the art that the term caulking gun is sometimes used to refer to a gun for dispensing other materials besides caulking. The same applies to caulking tubes. When a standard caulking gun and caulking tube is in use, the user squeezes the trigger to advance the caulking gun's plunger, thereby forcing caulking material from the caulking tube. Once the trigger is retracted fully against the handle, the user must depress and re-engage the trigger (or "re-cock" the device), to continue the flow of caulking material. This momentary halt in the advance of the plunger results in an inconsistent flow of caulking material. The inconsistent flow may cause the viscous material to flow in a thinner stream or create gaps when the trigger is re-engaged than when the trigger is being retracted (i.e. during re-cocking). For use in caulking guns and caulking tubes, the viscous material that flows from the caulking tube may also be referred to as the caulking bead. Thus, during re-cocking, a standard caulking gun may give a thinner bead of, or complete gap in, caulking material. In some embodiments, a steady flow effect is provided. The resiliently deformable member is configured to be placed or incorporated between the dispensing gun's plunger and the viscous material container. In some embodiments, the resiliently deformable member may be configured to fit within the plunger end of the viscous material container. In some embodiments, the resiliently deformable member may be configured for insertion into a caulking tube, between the caulking tube's plug and a caulking gun's plunger. In some embodiments, the deformable member may be integral with or coupled to the caulking tube or the dispensing gun. For example, the deformable member may be integral with or coupled to a caulking tube's end cap. The deformable member may be integral with or coupled to a caulking gun's plunger shaft. In some embodiments, the deformable member may be a separate and distinct component for use with a caulking gun and tube apparatus. In use, the resiliently deformable member is compressed by the plunger as the plunger advances within the viscous material container, displacing viscous material from the nozzle end of the container. When the user depresses and re-engages the trigger, while the plunger shaft momentarily halts, the resiliently deformable member begins to decompress to its relaxed state, thereby continuing the advance of the viscous material container's plug, and thereby continuing the flow of viscous material from the nozzle end of the container. As the user re-engages the trigger, the plunger shaft is again advanced, compressing the resiliently deformable member. Thus, the modulation of flow of viscous material is achieved. In some embodiments, a steady flow effect is achieved.

A "recoil effect", as used herein, refers to a halting or reduction in the flow of viscous material from a dispensing gun. This may also be referred to as a "dripless effect," i.e. a minimal drip effect. In relation to a caulking gun, the recoil effect can be said to create a dripless caulking gun. The dispensing gun may be of the type having: a frame adapted to receive a container; a handle extending from the frame; a plunger shaft slideably supported in the frame for dispensing viscous material from the container; a trigger coupled to the frame and retractable against the handle; and a plunger drive mechanism for engagement with the trigger and advancement of the plunger shaft when the trigger is retracted. The dispensing gun may further comprise a release mechanism to release the plunger shaft, and allow retraction of the plunger shaft. The dispensing gun may be a standard caulking gun. The resiliently deformable member, according to one or more embodiments of the present disclosure, is configured to be placed between the dispensing gun's plunger and the viscous material container. In some embodiments, the resiliently deformable member may be configured to fit within the plunger end of the viscous material container. In some embodiments, the resiliently deformable member may be configured for insertion into a caulking tube, between the caulking tube's plug and a caulking gun's plunger. In some embodiments, the deformable member may be integral with or coupled to the caulking tube or the dispensing gun. In use, the resiliently deformable member can be compressed by the plunger as the plunger advances within the viscous material container, displacing viscous material from the nozzle end of the container. If the user uses the release mechanism to release the plunger shaft, the resiliently deformable member according to embodiments of the present invention can be configured to rapidly decompress to its relaxed state. This rapid decompression or "recoil effect" results in the plunger shaft being retracted away from the container plug. This rapid decompression also results in a halting or reduction of the flow of viscous material from the container. In some embodiments, the recoil effect results in a complete halting of flow of viscous material from the container. In some embodiments, the recoil effect results in a reduction of flow of viscous material from the container. In some embodiments, the resiliently deformable member may provide a steady flow effect and not a recoil effect.

Although some embodiments of the resiliently deformable member disclosed herein comprise a compression spring, the resiliently deformable member is not limited to the compression spring as a source of resistance, drive, expansion, and/or force or transfer of energy. There are other methods such as, but not limited to: other types of springs; magnets; compressible air, gases, liquids, or gels; or other compressible materials such as rubbers, foams, or polymers. Types of springs include, but are not limited to: Compression Springs, Belleville Springs, Die Springs, and Redux Springs. In some embodiments, the resiliently deformable member is an air bladder or a fluid bladder. In some embodiments, the resiliently deformable member is a compressible foam. The resiliently deformable member may be any suitable material or design for applying a force between a viscous material container and a dispensing gun to modulate the flow of the material from the container.

The resiliently deformable member (all or any of its parts) can be used and/or applied to a caulking tube and caulking gun independently and/or as a whole and/or in conjunction to using any of its parts and/or other parts mentioned or not mentioned. Any suitable materials may be used in construction of the resiliently deformable member including, but not limited to: plastic, carbon fiber, ceramic, composite materials, rubber, foam, fiberglass, wood, fabric or fabric coverings steel, metal, steel alloys, or aluminum.

In some embodiments, the resiliently deformable member is a device composed of three main pieces that, when combined together, becomes a working tool and/or apparatus. When such a device is inserted into the end of a caulking tube and used with the caulking gun, for example, the device steadily dispenses caulking or adhesives without disrupting the flow of the tube contents while the caulking gun is being used in its normal operational function. In one embodiment, the three main components of the device are: (1) a top cap; (2) a bottom cap; and (3) a spring located between the top cap and the bottom cap. The top cap and the bottom cap form a movable housing for the spring to allow the spring to move between a relaxed and compressed state. In one embodiment, the deformable member comprises (1) a top cap comprising a smooth rounded cylinder-shaped cap with a stud post molded to its interior; (2) a bottom cap, which is also a smooth rounded cylinder-shaped cap with a stud post, its outside diameter smaller than the inside diameter of the top cap, allowing the bottom cap to slide into the top cap; and (3) the interior of the device has a spring that fits over and/or into the top and bottom stud posts located inside each cap (top and bottom).

In some embodiments, the resiliently deformable member can be used in conjunction with standard caulking guns and 300 ml sized tubes found in today's market. The resiliently deformable member may also be used with larger or smaller sized tubes, or differently shaped containers. The resiliently deformable member may also be used with tubeless caulking guns, or in systems where the viscous material is contained in a flexible plastic cylinder package or the like. For use with a tubeless system, the dispensing gun may be configured to receive a viscous material container comprising a flexible plastic sleeve. The flexible plastic sleeve may also be referred to as a "sausage tube" or a viscous material sleeve. The viscous material sleeve may be inserted into the dispensing gun, and the resiliently deformable member according to an embodiment of the present invention may be placed behind the viscous material sleeve and in front of the dispensing gun's plunger. In such an embodiment, once the plunger is engaged, it compresses the resiliently deformable member, which compresses the viscous material sleeve, causing the viscous material to dispense. Accordingly, it will be apparent to those skilled in the art that the method according to one or more embodiments of the present disclosure may be used with conventional caulking guns and tubes, alternative viscous material container designs, or any suitable dispensing apparatus, and is not limited to use in the construction industry.

The resiliently deformable member according to one or more embodiments of the present invention may be durable and reusable. Once the resiliently deformable member and viscous material container are installed in the dispensing gun, the user can apply an even bead of material (e.g. caulking or sealant) with ease and without wastage or mess. In such embodiments, the resiliently deformable member can be easily removed from the container to be re-used. For example, the resiliently deformable member can be removed from the container when the caulking gun is not in use, or once the contents of the container have been emptied. In other embodiments, the resiliently deformable member may be coupled to or integral with the tube or the gun. In one or more embodiments, the resiliently deformable member may be disposable. In one or more embodiments, the resiliently deformable member may be re-usable.

In some embodiments, the resiliently deformable member may be comprised of a high compression die spring encased in a two-piece sliding plastic sleeve. The high compression die spring can be rated to any appropriate strength. This device can be inserted into any standard 300 ml sized caulking tube regardless of the tube's constructed materials and contents of the tube. The device can be used with viscous material container of any suitable size, shape, or type. In some embodiments, no caulking gun alterations or modifications are required, as the resiliently deformable member can simply be placed or lodged in place. In other embodiments, the resiliently deformable member may be attached to and used with the dispensing apparatus, or attached to the viscous material container. In some embodiments, the resiliently deformable member may be integrated with or coupled to the dispensing apparatus and/or the viscous material container.

To gain a better understanding of the invention described herein, some embodiments are described in greater detail. It should be understood that these examples are for illustrative purposes only. Therefore, they should not limit the scope of this invention in any way.

Figure 1B:
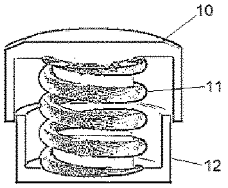
FIG. 1B shows a cross-sectional elevation view of a resiliently deformable member having a top-cap enclosure (10), a compression spring (11), a bottom-cap enclosure (12), and a protruding stud (13) inside each cap enclosure.

FIG. 1 illustrates an embodiment of the resilient deformable member consisting of three parts: top-cap enclosure (10), compression spring (11) and bottom-cap enclosure (12). In this embodiment, the top-cap enclosure (10) is larger than the bottom-cap enclosure (12) allowing them to slide into one another. Inside each cap enclosure (top and bottom) there is a protruding stud (13) located in the middle of the cap to allow the compression spring to slide over the stud of each cap.

Figure 2A:
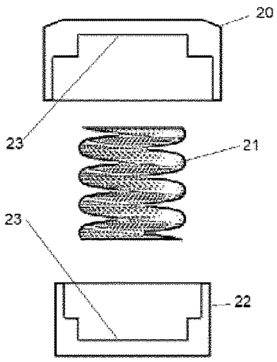
FIG. 2A shows an exploded cross-sectional elevation view.
Figure 2B:
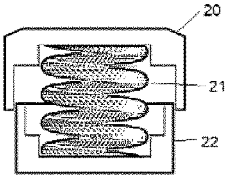
FIG. 2B shows a cross-sectional elevation view of a resiliently deformable member having a top-cap enclosure (20), a compression spring (21), a bottom-cap enclosure (22), and a hollowed-out center (23) inside each cap enclosure.

FIG. 2 illustrates another embodiment of the resiliently deformable member consisting of three parts: top-cap enclosure (20), compression spring (21) and bottom-cap enclosure (22). The top-cap enclosure (20) is larger than the bottom-cap enclosure (22) allowing them to slide into one another. Inside each cap enclosure (top and bottom) there is a hollowed-out center (23) to allow the compression spring to slide into each cap.

Figure 3A:
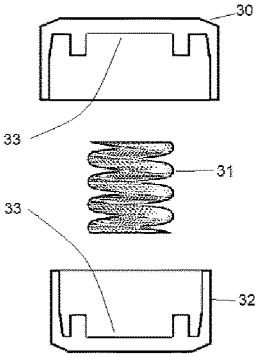
FIG. 3A shows an exploded cross-sectional elevation view.
Figure 3B:
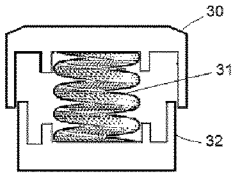
FIG. 3B shows a cross-sectional elevation view of a resiliently deformable member having a top-cap enclosure (30), a compression spring (31), a bottom-cap enclosure (32), and a hollowed-out stud (33) inside each cap enclosure

FIG. 3 illustrates another embodiment of the resiliently deformable member consisting of three parts: top-cap enclosure (30), compression spring (31) and bottom-cap enclosure (32). The top-cap enclosure (30) is larger than the bottom-cap enclosure (32) allowing them to slide into one another. Inside each cap enclosure (top and bottom) there is a hollowed-out stud (33) protruding in the middle to allow the compression spring to slide into the protruding stud of each cap.

The resiliently deformable members of FIG. 1-3 are, when both caps are installed over the spring, configured to be placed into a caulking tube, and the caulking tube placed into the caulking gun.

Figure 4:
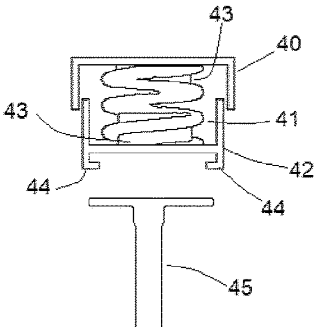
FIG. 4 shows a cross-sectional elevation view of another embodiment of the invention. The resiliently deformable member has a top-cap enclosure (40), a compression spring (41), a bottom-cap enclosure (42), and a protruding stud (43) inside each cap enclosure. The bottom-cap enclosure (42) has two arm hooks (44) to accommodate a dispensing gun's plunger plate.

FIG. 4 illustrates another embodiment of the resiliently deformable member consisting of a top-cap enclosure (40), a compression spring (41), and bottom-cap enclosure (42). The top-cap enclosure (40) is larger than the bottom-cap enclosure (42) to allow them to slide into one another. Each cap enclosure (top and bottom) has a protruding solid stud (43) that the compression spring can fit onto or over. In this embodiment, the bottom-cap enclosure has two arm hooks (44) that can accommodate a dispensing gun's plunger plate (45). When both caps are installed over the spring, the unit is complete and ready to use; it is ready to be placed into the caulking tube and the arm hooks secured onto the caulking gun's plunger plate. In other embodiments, the bottom-cap enclosure (42) may have two, three, or more arm hooks (44) for accommodating the dispensing gun's plunger plate (45).

Figure 5A:
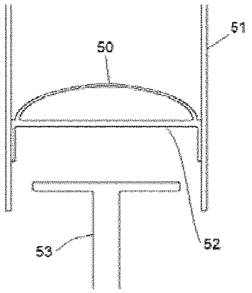
FIG. 5A shows a cross-sectional elevation view of the air bladder (50) incorporated into a caulking tube (51) as a component of the caulking tube's bottom cap (52).
Figure 5B:
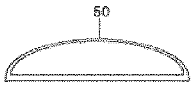
FIG. 5B shows a cross-sectional elevation view of a resiliently deformable member (50) composed of an air bladder.

FIG. 5 illustrates another embodiment of the resiliently deformable member composed of an air bladder (50). The air bladder (50) may be incorporated into the bottom cap (52) of a caulking tube (51) to achieve the steady flow effect and method. In one or more embodiments, the air bladder (50) may be integral with the caulking tube. For example, the air bladder (50) may be manufactured into the caulking tube at the manufacturing site. In the embodiment of FIG. 5, the caulking tube bottom cap (52) is composed of an air bladder (50) on the side (inside) of the caulking tube's contents. The cap (52) can be manufactured as a single or two-piece unit with the air bladder (50) such that when compressed in the caulking gun by the plunger plate (53), the air bladder (50) becomes pressurized creating the steady flow effect. In other embodiments, the bladder (50) may be filled with compressible or compressed gasses, liquids, gels, rubbers, or foams.

Figure 6A:
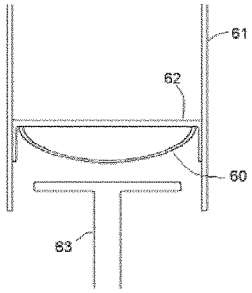
FIG. 6A shows a cross-sectional elevation view of the air bladder (60) incorporated into a caulking tube (61) as a component of the caulking tube's bottom cap (62).
Figure 6B:
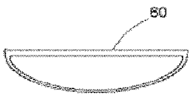
FIG. 6B shows a cross-sectional elevation view of a resiliently deformable member (60) composed of an air bladder.

FIG. 6 illustrates another embodiment of the resiliently deformable member composed of an air bladder (60). The air bladder (60) may be incorporated into the bottom cap (62) of a caulking tube (61) to achieve the steady flow effect and method. The air bladder (60) may be manufactured into the caulking tube at the manufacturing site. In the embodiment of FIG. 6, the caulking tube bottom cap (62) is composed of an air bladder (60) on the opposite side (outside) of the caulking tube's contents. The cap (62) can be manufactured as a single or two-piece unit with the air bladder (60) such that when compressed in the caulking gun by the plunger plate (63), the air bladder (60) becomes pressurized creating the steady flow effect.

Figure 7A:
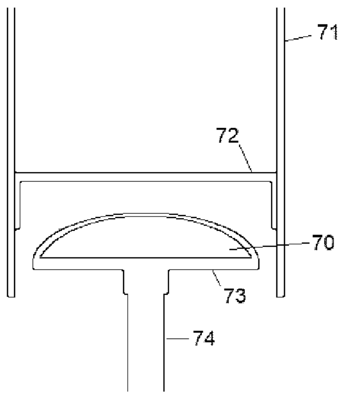
FIG. 7A shows a cross-sectional elevation view.
Figure 7B:
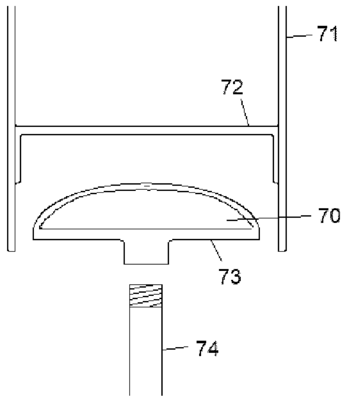
FIG. 7B shows an exploded cross-sectional elevation view of resiliently deformable member (70) composed of an air bladder. The air bladder (70) is a component of the dispensing gun's plunger (73) which can be fastened to the plunger shaft (74).

FIG. 7 illustrates another embodiment of the resiliently deformable member composed of an air bladder (70). The air bladder (70) may be incorporated into the plunger (73) of the dispensing gun, to achieve the steady flow effect and method. The air bladder (70) may be attached to a dispensing gun's plunger, or provided as a single piece (73) to be fastened onto a dispensing gun's plunger shaft (74). This may be achieved with a threaded bottom to be screwed onto the plunger shaft. The air bladder (70) may be provided at the time of manufacturing the dispensing gun, or the dispensing gun may be modified afterward. The resiliently deformable member may be provided as a single unit or multi-piece unit that, when compressed in the dispensing gun, the air cavity becomes pressurized creating the steady flow effect when engaging the cap (72) of a caulking tube (71).

Figure 8:
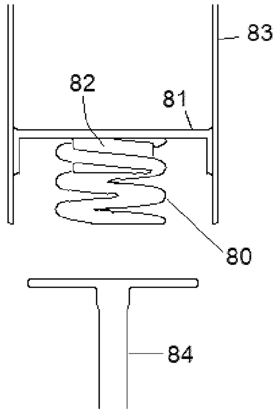
FIG. 8 shows a cross-sectional elevation view of another embodiment of the invention. Compression spring (80) is attached to the end cap (81) of a caulking tube (83) by a stud (82).

FIG. 8 illustrates another embodiment of the resiliently deformable member (80), manufactured into the caulking tube to achieve the steady flow effect and method. It may be manufactured into the plastic caulking tube's end cap (81) by the manufacturer of the tube (83). The cap (81) may be composed of molded plastic with a single hollow or solid stud (82) protruding from the middle of the cap (81). In the embodiment of FIG. 8, the stud (82) allows the compression spring (80) to be placed or slid into/onto the stud (82), securing it to the cap (81) and caulking tube (83). In such an embodiment, when the caulking tube (83) is placed into the caulking gun, the gun's plunger (84) pressurizes the compression spring allowing the steady flow effect and method. The attachment of the spring (80) onto the cap (81) is not limited to the use of a single stud (82), as embodied in FIG. 8. A person of skill in the art would readily know that this may be accomplished similarly to the methods demonstrated in FIGS. 1-3, or by any other suitable method.

Figure 9:
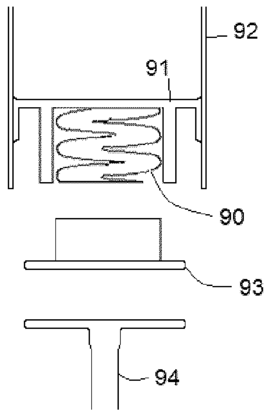
FIG. 9 shows a cross-sectional elevation view of another embodiment of the invention. The end cap (91) of a caulking tub (92) accommodates spring (90), which may be used with or without studded cap (93).

FIG. 9 illustrates another embodiment of the resiliently deformable member, manufactured into the caulking tube (92) to achieve the steady flow effect and method. The caulking tube cap (91) may be composed of molded plastic with a hollowed-out stud in the middle of the tube cap to accompany a spring (90). In the embodiment of FIG. 9, the spring (90) is nestled into the stud securing it to the cap (91) and caulking tube (92). The caulking tube spring (90) can be used with or without an additional bottom studded cap (93). This studded cap can also be attached to the caulking gun's plunger (94) to activate the steady flow effect or without the studded cap deactivating the steady flow effect. In other words, the steady flow effect can be turned on and off using the steady flow cap of FIG. 9.

Figure 10:
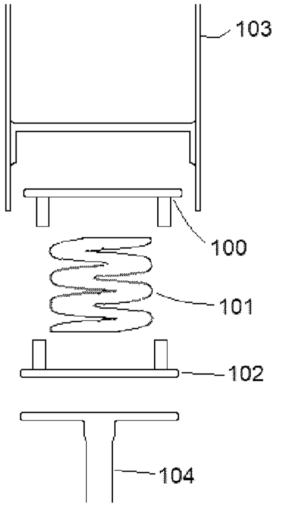
FIG. 10 shows a cross-sectional elevation view of a resiliently deformable member having a top cap (100), a compression spring (101), a bottom cap (102). Similarly.
Figure 11:
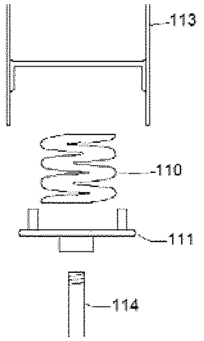
FIG. 11 and FIG. 12 show cross-sectional elevation views of resiliently deformable members having compression springs (110 and 120, respectively), and bottom caps (111 and 121, respectively), without top caps.
Figure 12:
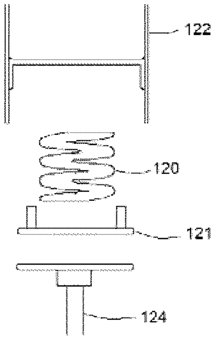

FIG. 10 illustrates another embodiment of the resiliently deformable member consisting of a top cap (100) that is hollowed, a compression spring (101) and a bottom cap (102) similar to the top cap, being hollowed-out. In such an embodiment, the compression spring (101) fits into the top cap and bottom cap. Once together the resiliently deformable member of FIG. 10 is complete and can be inserted into the caulking tube (103) or attached to the dispensing gun's plunger (104) for use. FIG. 11 and FIG. 12 show similar embodiments that may be used with only a bottom cap and spring. FIG. 11 shows that compression spring (110) may be housed in a bottom cap (111) that is threaded, to be attached to the dispensing gun's plunger shaft (113), for use with a caulking tube (113). FIG. 12 shows that compression spring (120) may be housed in a bottom cap (121) for attachment to a dispensing gun's plunger (124) for use with a caulking tube (122).

Figure 13:
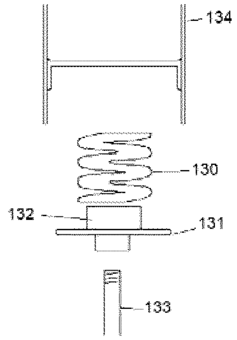
FIG. 13 and FIG. 14 show cross-sectional elevation views of resiliently deformable members having a compression spring (130 or 140), and a bottom cap (131 or 141) with a middle stud (132 or 142). The cap may be threaded (131) or threadless (141).
Figure 14:
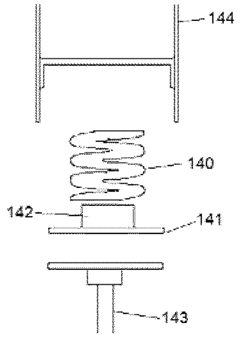

FIG. 13 and FIG. 14 illustrate other embodiments of the resiliently deformable member consisting of compression springs (130 and 140, respectively) and bottom caps (131 and 141, respectively) having middle studs (132 and 142, respectively). In these embodiments, the compression spring (130 or 140) fits over the cap stud (132 or 142) which secures it to the cap (131 or 141). The bottom cap (131) can be threaded to be attached to the caulking gun's plunger shaft (133) for use with a caulking tube (134), as in FIG. 13. In other embodiments, such as that of FIG. 14, the bottom cap (141) can be a threadless cap that can be placed into the caulking tube (144) freely, for use with a caulking gun plunger (143).

Figure 15:
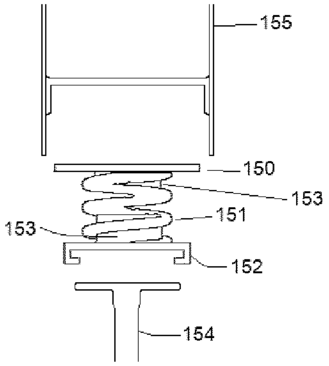
FIG. 15 shows a cross-sectional elevation view of a resiliently deformable member having a top cap (150), compression spring (151), and bottom cap (152) with a slotted bottom to slide over the dispensing gun's plunger (154). The compression spring (151) is secured by the cap stud (153).

FIG. 15 illustrates another embodiment of the resiliently deformable member consisting of three parts: top cap (150), compression spring (151), and bottom cap (152). In such an embodiment, the caps have protruding studs (153) to allow the compression spring (151) to be inserted into the caps (150 and 152). The bottom cap (152) of the embodiment of FIG. 15 has a slotted bottom that slides over the dispensing gun's plunger (154) that can be easily removed or re-attached. The resiliently deformable member of FIG. 15 is configured to be placed into the back of a caulking tube (155).

Figure 16:
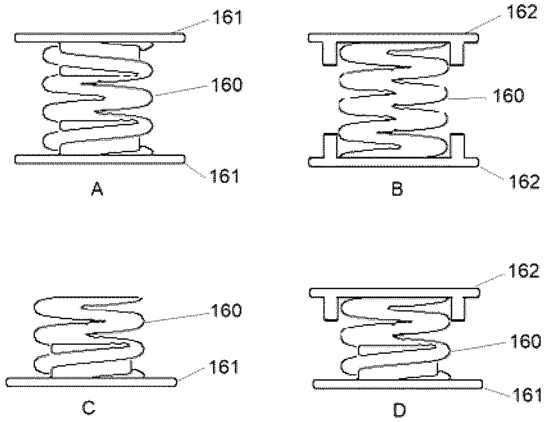
FIG. 16 shows cross-sectional elevation views of resiliently deformable members having a compression spring (160) and one or two caps, the caps either having a solid stud (161) or a hollowed stud (162).

FIG. 16 illustrates other embodiments of the resiliently deformable member consisting of a compression spring (160) and one or two caps. In such embodiments, each cap may have a solid stud (161) or a hollowed stud (162) that the compression spring (160) can fit into. FIG. 16A shows spring (160) with two studded caps (161); FIG. 16B shows spring (160) with two hollowed caps (162); FIG. 16C shows spring (160) with a single studded cap (161); and FIG. 16D shows spring (160) with a studded cap (161) and a hollowed cap (162). In some embodiments, the caps may instead be integral with, attachable to, or coupled to a dispensing gun and/or a viscous material container. For example: the solid stud (161) or hollowed stud (162) may be: a part of the plunger shaft of a dispensing gun; a part of the container plug of a viscous material container; or both. In such an embodiment, the resiliently deformable member may be a spring for engaging the solid stud (161) and/or hollowed stud (162) on at least one of the plunger shaft or container plug.

Figure 17:
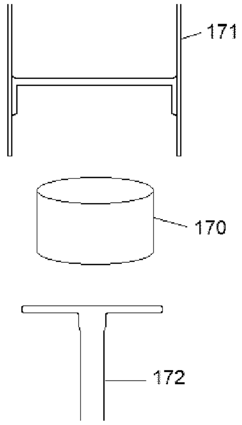
FIG. 17 and FIG. 18 show cross-sectional elevation views of resiliently deformable members made of a single piece of high-density foam (170) or several layers of high-density foam (180).
Figure 18:
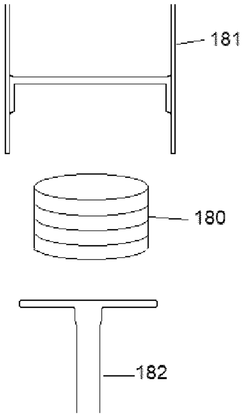

In other embodiments, the resiliently deformable member may be made from a foam of appropriate density and compressibility, or several layers of foam. The foam may be in any shape. In one or more embodiments, the foam may be cylindrical. FIG. 17 illustrates an embodiment of the resiliently deformable member being one piece of high-density foam (170), configured to be inserted into the back of a caulking tube (171) and compressed with a dispensing gun plunger (172). FIG. 18 illustrates an embodiment of the resiliently deformable member being one piece of several layers of high-density foam (180), configured to be inserted into the back of a caulking tube (181) and compressed with a dispensing gun plunger (182). In some embodiments, the resiliently deformable member may be placed on, adhered to, coupled to, attachable to, integral with, or otherwise engageable with a viscous material container, such as the container plug of a caulking tube. In some embodiments, the resiliently deformable member may be placed on, adhered to, coupled to, attachable to, integral with, or otherwise engageable with a dispensing gun, such as the plunger of a caulking gun. In one or more embodiments, there is provided a viscous material container comprising a resiliently deformable member, such as at least one piece of high-density foam (e.g. 170 or 180).

Figure 19:
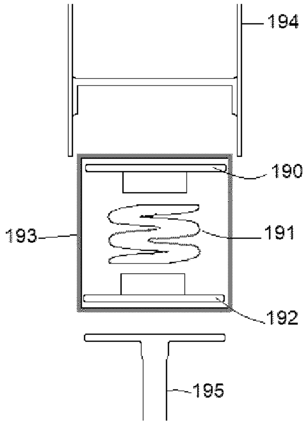
FIG. 19 shows a cross-sectional elevation view of a resiliently deformable member consisting of a top cap (190), compression spring (191), bottom cap (192), and enclosure (193).

FIG. 19 illustrates another embodiment of the resiliently deformable member consisting of four pieces; top cap (190) that has a solid stud protruding, compression spring (191), bottom cap (192) that has a solid stud protruding, and enclosure (193). For assembly, the compression spring (191) of the embodiment in FIG. 19 slides over the top cap's stud which secures it to the cap. Such an embodiment can have a similar bottom cap. Once the cap or caps are secured to the spring of FIG. 19, an enclosure (193) can be placed over that unit (caps and spring). In some embodiments, the enclosure (193) may be a fabric wrapping. In other embodiments, the enclosure material may be plastic, fabric, cotton, or any other suitable flexible or solid material. The embodiment of FIG. 19 is configured to be inserted into the back end of a caulking tube (194) and to be used with the caulking gun plunger (195).

Figure 20:
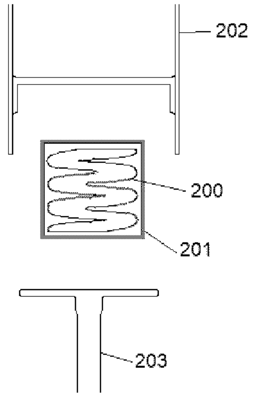
FIG. 20 shows a cross sectional elevation view of a resiliently deformable member consisting of a compression spring (200) and enclosure (201).

FIG. 20 illustrates another embodiment of the resiliently deformable member consisting of two parts: compression spring (200) and an enclosure or covering (201). The resiliently deformable member of such an embodiment is designed to fit into the back of a caulking tube (202) for use with a dispensing gun's plunger (203). The enclosure (201) may protect the spring from damage and entanglement. The enclosure (201) may be made of fabric, plastic, cloth, and other any other flexible or non-flexible material.

Figure 21A:
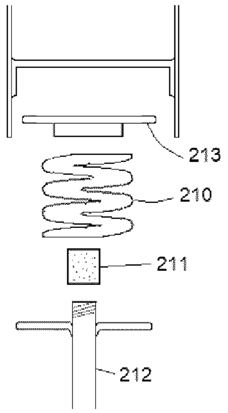
Figure 21B:
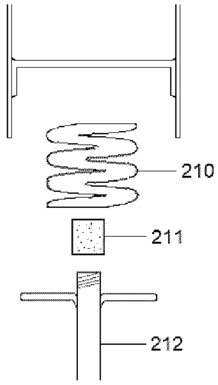
FIG. 21B shows an embodiment without a top cap.

In some embodiments, the resiliently deformable member may be attached directly to the dispensing gun's plunger shaft. For example, the resiliently deformable member may be threaded, and used with a dispensing gun of the type having a threaded plunger shaft with a removable plunger plate, or of the type having a removable plunger nut at the end of the plunger. A person of skill in the art will readily know that there are many ways the resiliently deformable member may be attached to the dispensing gun's plunger, which is not limited to the embodiments shown in the Figures. FIG. 21 illustrates other embodiments of a resiliently deformable member having a compression spring (210) and a threaded thumb nut (211) to be threaded onto a dispensing gun's plunger shaft (212) of the type having a plunger nut that has been removed. In such an embodiment, the compression spring slides onto or over the thumb nut (211), securing it to the plunger shaft (212). The compression spring (210) may or may not be used with a top cap (213). The embodiment in FIG. 21A shows a top cap (213) of the type having a protruding stud, but any type of cap capable of securing the compression spring (210) may be used in its place.

Figure 22:
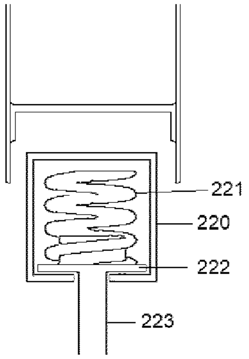
FIG. 22 and FIG. 23 show cross-sectional elevation views of resiliently deformable members consisting of an enclosure (220 or 230), compression spring (221 or 231), and bottom caps (222 or 232).
Figure 23:
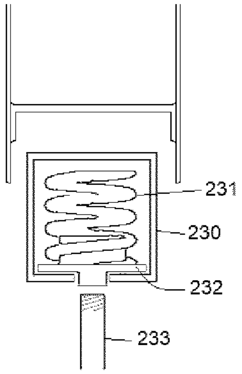

FIG. 22 and FIG. 23 illustrate other embodiments of resiliently deformable members consisting of: an enclosure (220 or 230) which may be formed from one or more pieces, compression spring (221 or 231) and bottom cap (222 or 232). The bottom cap may be manufactured as a part of the dispensing gun's plunger (223), as in cap 222 of FIG. 22, or as a unit which can be attached and removed from the plunger shaft (233), as in cap 232 of FIG. 23. The bottom cap (222 or 232) may be disk shaped with a protruding stud, as demonstrated in FIG. 22 and FIG. 23, or the cap may be differently shaped, or comprise other means for attaching the compression spring such as a hollowed stud or hollowed cap. The enclosure (220 or 230) may protect the resiliently deformable member from damage or entanglement. The bottom cap (232) can be manufactured with a bottom plunger thread that can accept the dispensing gun's threaded plunger shaft, allowing for easy removal. In the embodiment shown in FIGS. 22 and 23, when the dispensing gun is engaged, it pushes the plunger shaft, compressing the spring to create the steady flow effect onto the tubes contents.

Figure 24A:
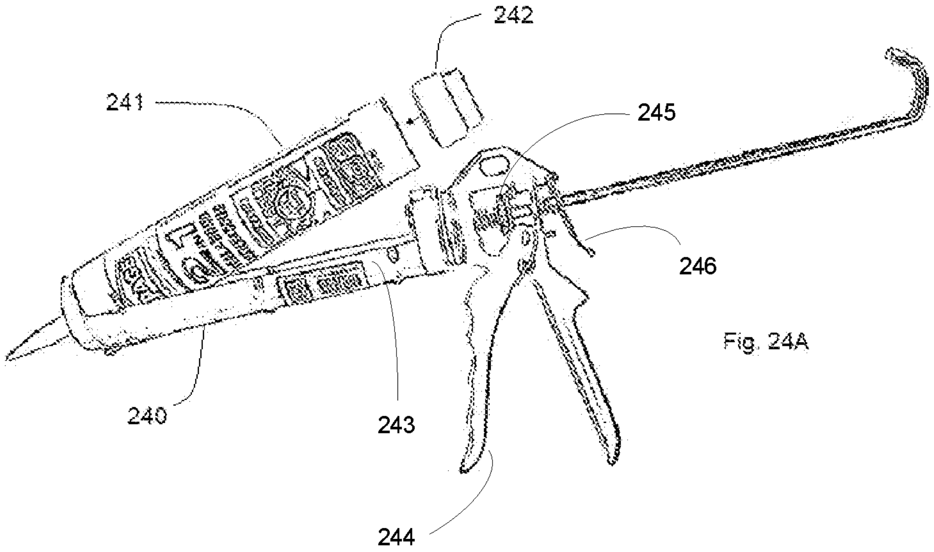
FIG. 24 shows a perspective view of dispensing gun (240), which receives the viscous material container (241), which in turn receives a resiliently deformable member (242), before insertion (FIG. 24A) and after (FIG. 24B). The exemplified dispensing gun is of the common type having a frame (243), a trigger (244), a plunger drive mechanism (245) and a release mechanism (246).
Figure 24B:
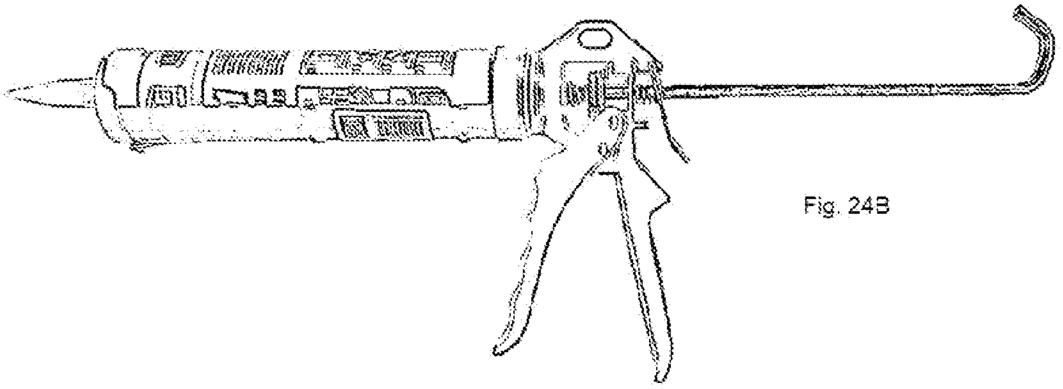

FIG. 24 shows how a resiliently deformable member (242) is configured to be placed inside the back of a viscous material container (241) such as a caulking tube, and the viscous material container (241) is configured to be placed inside a dispensing gun (240). As perhaps best shown in FIG. 24, the elements of the device are configured together and positioned to be incorporated into the caulking tube and installed into the caulking gun. The user can then guide the device while using the caulking gun to dispense caulking while the hand-held cocking lever, or trigger, is being activated. In this way, the caulking is applied at a uniform rate of distribution.

In some embodiments, the components for the resiliently deformable member may be provided in the form of a kit. A kit preferably contains instructions for the use thereof. The kit may further comprise a viscous material container and/or a dispensing gun. The kit may further comprise a caulking tube and/or caulking gun.

In some embodiments the present disclosure provides a resiliently deformable member for use in an apparatus for dispensing a viscous material from a container, the apparatus of the type comprising a container for holding the viscous material and a dispensing gun, the resiliently deformable member having a relaxed state and a compressed state, the resiliently deformable member configured to apply a force between the container and the dispensing gun to modulate the flow of the material from the container when the dispensing gun is in use. The resiliently deformable member may be for use in an apparatus for dispensing a viscous material from a container, wherein the container is a viscous material container, and the dispensing gun is of the type having: a frame adapted to receive the container; a handle extending from the frame; a plunger shaft slideably supported in the frame for dispensing the viscous material from the container; a trigger coupled to the frame and retractable against the handle; and a plunger drive mechanism for engagement with the trigger and advancement of the plunger shaft when the trigger is retracted, the resiliently deformable member adapted to fit between the viscous material container and the plunger shaft, and for applying a force therebetween to modulate flow of the material from the container when the apparatus is in use.

The resiliently deformable member may be for use in an apparatus for dispensing a viscous material from a container, wherein the container is a container for holding viscous material, the container having: a nozzle end, a plunger end, and a plug slideably supported in the container for dispensing the viscous material from the nozzle end of the container; and the dispensing gun is of the type having: a frame adapted to receive the container; a handle extending from the frame; a plunger shaft slideably supported in the frame for advancing the container plug; a trigger pivoted to the frame and retractable against the handle; and a plunger drive mechanism for engagement with the trigger and advancement of the plunger shaft when the trigger is retracted, the resiliently deformable member adapted to fit between the container plug and the plunger shaft, the resiliently deformable member compressible when the plunger shaft is advanced, the resiliently deformable member for applying a force between the container plug and plunger when in the compressed state to modulate the flow of viscous material from the container when the apparatus is in use.

In some embodiments the present invention provides a resiliently deformable member for use in an apparatus for dispensing a viscous material, the apparatus comprising a viscous material container, and a dispensing gun of the type having: a frame adapted to receive the container; a handle extending from the frame; a plunger shaft slideably supported in the frame for dispensing the viscous material from the container; a trigger coupled to the frame and retractable against the handle; and a plunger drive mechanism for engagement with the trigger and advancement of the plunger shaft when the trigger is retracted, the resiliently deformable member having a relaxed state and a compressed state, the resiliently deformable member adapted to fit between the viscous material container and the plunger shaft, and for applying a force therebetween to modulate flow of the material from the container when the apparatus is in use.

In some embodiments the present invention provides a resiliently deformable member for use in an apparatus for dispensing a viscous material, the apparatus comprising: a container for holding viscous material, the container having a nozzle end, a plunger end, and a plug slideably supported in the container for dispensing the viscous material from the nozzle end of the container; and a dispensing gun of the type having: a frame adapted to receive the container; a handle extending from the frame; a plunger shaft slideably supported in the frame for advancing the container plug; a trigger pivoted to the frame and retractable against the handle; and a plunger drive mechanism for engagement with the trigger and advancement of the plunger shaft when the trigger is retracted, the resiliently deformable member having a relaxed state and a compressed state, the resiliently deformable member adapted to fit between the container plug and the plunger shaft, the resiliently deformable member compressible when the plunger shaft is advanced, the resiliently deformable member for applying a force between the container plug and plunger when in the compressed state to modulate the flow of viscous material from the container when the apparatus is in use.

In any of the preceding embodiments the resiliently deformable member may comprise a spring having a first end to engage the plunger shaft and a second end to engage the container plug, wherein the spring is compressed in the compressed state, and relaxed in the relaxed state. In some embodiments the resiliently deformable member may further comprise a housing at least partially enclosing the spring. In any of the preceding embodiments, the housing may comprise a first cap to receive the first end of the spring and to engage the plunger shaft. In any of the preceding embodiments the first cap may be attachable to, or a part of, the plunger shaft. In any of the preceding embodiments, the housing may comprise a second cap to receive the second end of the spring and to engage the container plug. In any of the preceding embodiments, the second cap may be attachable to, or a part of, the container plug.

In any of the preceding embodiments, the resiliently deformable member of the present invention may comprise a compressible solid, such as a rubber or foam. In some embodiments, the compressible solid having a first end to engage the plunger shaft and a second end to engage the container plug, wherein the compressible solid is compressed in the compressed state, and relaxed in the relaxed state. In any of the preceding embodiments, the resiliently deformable member of the present invention may comprise a compressible material selected from the group consisting of gases, liquids, solids, rubbers, gels, or foams. In any of the preceding embodiments, the compressible material may be contained in a flexible enclosure having a first end to engage the plunger shaft and a second end to engage the container plug, wherein the compressible material is compressed in the compressed state, and relaxed in the relaxed state.

In some embodiments, the present invention provides a method of modulating the flow of viscous material from a viscous material container disposed in a dispensing gun, the method comprising: (a) providing a resiliently deformable member between the container and the dispensing gun, the resiliently deformable member having a relaxed state and a compressed state; and (b) dispensing at least a portion of the viscous material from the container using the dispensing gun, thereby engaging the resiliently deformable member to apply a force between the container and the dispensing gun to modulate flow of the viscous material from the container.

The method of the preceding embodiment may be for modulating the flow of viscous material from a viscous material container disposed in a dispensing gun, wherein the dispensing gun is of the type having: a frame adapted to receive the cartridge; a handle extending from the frame; a plunger shaft slideably supported in the frame for dispensing the viscous material from the cartridge; a trigger pivotably connected to the frame and retractable against the handle; and a plunger drive mechanism operatively coupled to the trigger for controlling advancement of the plunger shaft, wherein: in step (a), the resiliently deformable member is provided between the cartridge and the plunger; and step (b) comprises: (i) retracting the trigger against the handle, thereby engaging the plunger drive mechanism to advance the plunger shaft to compress the resiliently deformable member to the semi-compressed state as the plunger shaft is advanced and dispensing at least a portion of the viscous material from the cartridge; (ii) releasing the handle, thereby permitting the resiliently deformable member to decompress toward the relaxed state thereby maintaining pressure against the plunger such that the viscous material continues to flow from the cartridge; and (iii) optionally repeating (i) and (ii).

The method of a preceding embodiment may be for modulating the flow of viscous material from a viscous material container disposed in a dispensing gun wherein the dispensing gun is of the type having: a frame adapted to receive the cartridge; a handle extending from the frame; a plunger shaft slideably supported in the frame for dispensing the viscous material from the cartridge; a trigger pivotably connected to the frame and retractable against the handle; a plunger drive mechanism operatively coupled to the trigger for controlling advancement of the plunger shaft, and a release mechanism operatively coupled to the plunger shaft for releasing the plunger shaft and allowing retraction of the plunger shaft, wherein: in step (a), the resiliently deformable member is provided between the cartridge and the plunger; and step (b) comprises: (i) retracting the trigger against the handle, thereby engaging the plunger drive mechanism to advance the plunger shaft to compress the resiliently deformable member to the semi-compressed state as the plunger shaft is advanced and dispensing at least a portion of the viscous material from the cartridge; (ii) releasing the handle, thereby permitting the resiliently deformable member to decompress toward the relaxed state thereby maintaining pressure against the plunger such that the viscous material continues to flow from the cartridge; (iii) optionally repeating (i) and (ii); and (iv) engaging the release mechanism, thereby allowing rapid decompression of the resiliently deformable member and retraction of the plunger shaft, and thereby halting or reducing the flow of viscous material from the dispensing gun.

In some embodiments, the present invention provides a method of modulating the flow of viscous material from a viscous material cartridge disposed in a dispensing gun, the dispensing gun of the type having: a frame adapted to receive the cartridge; a handle extending from the frame; a plunger shaft slideably supported in the frame for dispensing the viscous material from the cartridge; a trigger pivotably connected to the frame and retractable against the handle; and a plunger drive mechanism operatively coupled to the trigger for controlling advancement of the plunger shaft, the method comprising: (a) providing a resiliently deformable member between the cartridge and the plunger, the resiliently deformable member having a relaxed state and a semi-compressed state; (b) retracting the trigger against the handle, thereby engaging the plunger drive mechanism to advance the plunger shaft to compress the resiliently deformable member to the semi-compressed state as the plunger shaft is advanced and dispensing at least a portion of the viscous material from the cartridge; (c) releasing the handle, thereby permitting the resiliently deformable member to decompress toward the relaxed state thereby maintaining pressure against the plunger such that the viscous material continues to flow from the cartridge; and (d) optionally repeating (b) and (c).

In some embodiments, the present invention provides a method of modulating the flow of viscous material from a viscous material cartridge disposed in a dispensing gun, the dispensing gun of the type having: a frame adapted to receive the cartridge; a handle extending from the frame; a plunger shaft slideably supported in the frame for dispensing the viscous material from the cartridge; a trigger pivotably connected to the frame and retractable against the handle; a plunger drive mechanism operatively coupled to the trigger for controlling advancement of the plunger shaft, and a release mechanism operatively coupled to the plunger shaft for releasing the plunger shaft and allowing retraction of the plunger shaft, the method comprising: (a) providing a resiliently deformable member between the cartridge and the plunger, the resiliently deformable member having a relaxed state and a semi-compressed state; (b) retracting the trigger against the handle, thereby engaging the plunger drive mechanism to advance the plunger shaft to compress the resiliently deformable member to the semi-compressed state as the plunger shaft is advanced and dispensing at least a portion of the viscous material from the cartridge; (c) releasing the handle, thereby permitting the resiliently deformable member to decompress toward the relaxed state thereby maintaining pressure against the plunger such that the viscous material continues to flow from the cartridge; (d) optionally repeating (b) and (c); and (e) engaging the release mechanism, thereby allowing rapid decompression of the resiliently deformable member and retraction of the plunger shaft, and thereby halting or reducing the flow of viscous material from the dispensing gun.

In some embodiments, the present invention provides a kit comprising the resiliently deformable member according to any of the preceding embodiments of the invention and instructions for the use thereof. In some embodiments, the kit may further comprise a viscous material container and/or a dispensing gun.

In some embodiments, the present invention provides a dispensing gun comprising the resiliently deformable member according to any of the preceding embodiments of the invention. The dispensing gun may have the resiliently deformable member according to any of the preceding embodiments integral with, attachable to, or coupled to the dispensing gun. In some embodiments, the present invention provides a viscous material container for use with a dispensing gun, the viscous material container comprising the resiliently deformable member according to any of the preceding embodiments of the invention. The viscous material container may have the resiliently deformable member according to any of the preceding embodiments integral with, attachable to, or coupled to the viscous material container. The resiliently deformable member may be connectable to the dispensing gun and/or the viscous material container by any suitable means, such as friction fit, adhesive, or snap closure.

In some embodiments, the present invention provides an assembly comprising the resiliently deformable member according to any of the preceding embodiments and one or both of a dispensing gun and a viscous material container. The assembly according to the preceding embodiment may comprise both the dispensing gun and the viscous material container. The assembly according to any of the preceding embodiments may have the resiliently deformable member integral with, attachable to, or coupled to the dispensing gun. The assembly according to any of the preceding embodiments may have the resiliently deformable member integral with, attachable to, or coupled to the viscous material container. In any of the preceding embodiments, the resiliently deformable member may be integral with, attachable to, or coupled to the viscous material container and/or the dispensing gun, such as being affixed thereto by any suitable means, such as being fastened, adhered, welded, magnetically coupled. The resiliently deformable member may be integral with the viscous material container and/or the dispensing gun, such as being integral with the dispensing gun's plunger shaft or the viscous material container plug.

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprise" and/or "comprising," when used in this specification, specify the presence of stated features, steps, operations, elements, and/or components, but do not preclude the presence or addition of one or more other features, steps, operations, elements, components, and/or groups there of.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of those has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Devices, apparatuses, and methods associated with a resiliently deformable member for use in an apparatus for dispensing a viscous material from a container are discussed herein. This includes, but is not limited to the use of a resiliently deformable member with caulking tubes and caulking guns. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures and/or the materials made referenced or description below.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

The embodiments described herein are intended to be examples only. Alterations, modifications and variations can be effected to the particular embodiments by those of skill in the art. The scope of the claims should not be limited by the particular embodiments set forth herein, but should be construed in a manner consistent with the specification as a whole.

All publications, patents and patent applications mentioned in this Specification are indicative of the level of skill of those skilled in the art to which this invention pertains and are herein incorporated by reference to the same extent as if each individual publication, patent, or patent application was specifically and individually indicated to be incorporated by reference.

The invention being thus described, it will be obvious that the same may be varied in many ways. Such variations are not to be regarded as a departure from the spirit and scope of the invention, and all such modification(s) as would be obvious to one skilled in the art are intended to be included within the scope of the following claims.

What is claimed is:

1. An apparatus for dispensing a viscous material, the apparatus comprising:

a dispensing gun including a plunger;

a container for holding the viscous material, the container comprising a first end having a nozzle, a second end opposite the first end, and a bottom cap recessed within the second end, wherein the bottom cap is configured to be shifted from the second end toward the first end of the container upon pushing of the plunger into the second end of the container to dispense the viscous material from the nozzle during use of the dispensing gun; and a resiliently deformable member including a compression spring interposed between first and second slidable cap enclosures, said resiliently deformable member being at least partially recessed within the second end of the container and entirely between the bottom cap and the plunger, the resiliently deformable member having a relaxed state and a compressed state, wherein the resiliently deformable member is configured to shift between the relaxed and compressed states to modulate a flow of the viscous material from the container when the dispensing gun is in use.

2. The apparatus of claim 1, wherein, the resiliently deformable member is a separate and distinct component from each of the dispensing gun and the container.

3. The apparatus of claim 2, wherein the dispensing gun comprises: a frame adapted to receive the container; a handle extending from the frame; a plunger shaft attached to the plunger and slideably supported in the frame for dispensing the viscous material from the container; a trigger coupled to the frame and retractable against the handle; a plunger drive mechanism for engagement with the trigger and advancement of the plunger shaft when the trigger is retracted; and wherein the resiliently deformable member is configured to transfer forces from the plunger to the bottom cap to modulate flow of the viscous material from the container when the apparatus is in use.

4. A method of modulating a flow of viscous material from a container disposed in a dispensing gun, with the container having a nozzle end for dispensing the viscous material and a plunger end, including a bottom cap, for receiving a plunger of the dispensing gun, the method comprising:

(a) providing a resiliently deformable member between the bottom cap and the plunger, the resiliently deformable member including first and second slidable cap enclosures and a compression spring interposed between the first and second cap enclosures, said resiliently deformable member being at least partially recessed within the container and entirely between the bottom cap and the plunger, while having a relaxed state and a compressed state;

(b) dispensing at least a portion of the viscous material from the container by operating the dispensing gun to cause the plunger to engage the second cap enclosure, compress the compression spring through the second cap enclosure and shift the bottom cap through engagement with the first cap enclosure, wherein the resiliently deformable member is employed to apply a force between the container and the dispensing gun and to modulate flow of the viscous material from the container.

5. A resiliently deformable member configured to be positioned between a bottom cap, located within a container for holding a viscous material, and a plunger of a dispensing gun, comprising:

first and second slidable cap enclosures; and a compression spring interposed between the first and second cap enclosures, said resiliently deformable member being configured to be at least partially recessed within the container and entirely between the bottom cap and the plunger, the resiliently deformable member having a relaxed state and a compressed state, wherein the resiliently deformable member is configured to shift between the relaxed and compressed states to modulate a flow of the viscous material from the container when the dispensing gun is in use.

6. The resiliently deformable member of claim 5, further comprising first and second studs protruding located within the first and second cap enclosures, respectively, said compression spring being positioned over each of the first and second studs.

7. The resiliently deformable member of claim 5, wherein each of the first and second cap enclosures includes a hollowed out center portion, said compression spring being received in the hollowed out center portion of each of the first and second cap enclosures.

8. The resiliently deformable member of claim 5, wherein the first cap enclosure slidably extends about the second cap enclosure, with the compression spring being entirely housed within the first and second cap enclosures.

9. The resiliently deformable member of claim 8, further comprising multiple arm hooks integral with the second cap enclosure, with the multiple arm hooks being configured to affix the resiliently deformable member to a dispenser gun plunger plate.

* * * * *